United States Patent
Cohen et al.

[11] Patent Number: 5,903,888
[45] Date of Patent: May 11, 1999

[54] METHOD AND APPARATUS FOR USING INCOMPATIBLE TYPES OF INDEXES TO PROCESS A SINGLE QUERY

[75] Inventors: Jeffrey Ira Cohen, Sunnyvale; Cetin Ozbutun, San Carlos; Hakan Jakobsson, San Francisco; Michael Depledge, San Jose, all of Calif.

[73] Assignee: Oracle Corporation, Redwood Shores, Calif.

[21] Appl. No.: 08/808,096

[22] Filed: Feb. 28, 1997

[51] Int. Cl.$^6$ .................................................... G06F 17/30
[52] U.S. Cl. ....................... 707/3; 707/2; 707/4; 707/10
[58] Field of Search ................................ 707/2, 3, 4, 10

[56] References Cited

U.S. PATENT DOCUMENTS

| | | | |
|---|---|---|---|
| 5,043,872 | 8/1991 | Cheng et al. | 707/2 |
| 5,412,806 | 5/1995 | Du et al. | 707/2 |
| 5,495,608 | 2/1996 | Antoshenkov | 707/3 |
| 5,649,181 | 7/1997 | French et al. | 707/3 |
| 5,732,258 | 3/1998 | Jakobsson et al. | 707/4 |
| 5,761,653 | 6/1998 | Schiefer et al. | 707/2 |
| 5,778,353 | 7/1998 | Schiefer et al. | 707/2 |

OTHER PUBLICATIONS

"Oracle TextServer3 Concepts, Version 3," Oracle Corporation (Part No. A24984–1, 1995, pp. 3–1 to 3–23).
"Oracle Textserver3 Concepts, Release 3.1," Oracle Corporation (Part No. A41697–2), 1996, pp. 3–1 to 3–29.

Primary Examiner—Wayne Amsbury
Assistant Examiner—Shahid Alam
Attorney, Agent, or Firm—McDermott, Will & Emery

[57] ABSTRACT

A method and apparatus for processing a query combines the use of different index types to minimize the rows of data that need to be retrieved from a table. A first index is accessed based on a query to produce a first result having a first format, for example a bitmap index outputting a bitmap. A second index, for example a B-tree index, is also accessed based on the query to produce a second result having a second format, for example a sequence of rowids. The first result is converted to a converted result having the second format, and the converted result and the second result are combined to obtain an end result. The end result can then be used to locate data that satisfies the query while minimizing the rows of data that need to be retrieved from a table during the query processing.

10 Claims, 7 Drawing Sheets

METHOD AND APPARATUS FOR USING INCOMPATIBLE TYPES OF INDEXES TO PROCESS A SINGLE QUERY

RELATED APPLICATIONS

The present application is related to: U.S. patent application Ser. No. 08/807,344, entitled "CREATING BITMAPS FROM MULTI-LEVEL IDENTIFIERS" now pending, filed by Cetin Ozbutun, Michael Depledge, Hakan Jakobsson, Mark Kremer, Jeffrey I. Cohen, Quoc Tai Tran, and Alexander C. Ho on the equal day herewith, (attorney docket no. 3018-032) the contents of which are incorporated herein by reference.

U.S. patent application Ser. No. 08/808,584, entitled "BITMAP SEGMENTATON" now pending, filed by Cetin Ozbutun, Jeffrey I. Cohen, Hakan Jakobsson, Mark Kremer, Michael Depledge, Quoc Tai Tran, Alexander C. Ho, and Julian Hyde, on the equal day herewith, (attorney docket no. 3018-034) the contents of which are incorporated herein by reference.

U.S. patent application Ser. No. 08/752,128, entitled "METHOD AND APPARATUS FOR PROCESSING COUNT STATEMENTS IN A DATABASE SYSTEM" U.S. Pat. No. 5,819,256, filed by Cetin Ozbutun, Michael Depledge, Hakan Jakobsson, and Jeffrey I. Cohen, on Nov. 20, 1996, (attorney docket no. 3018-033) the contents of which are incorporated herein by reference.

U.S. patent application Ser. No. 08/808,097, entitled "GROUP BY AND DISTINCT SORT ELIMINATION USING COST-BASED OPTIMIZATION" U.S. Pat. No. 5,822,748, filed by Jeffrey Ira Cohen, Cetin Ozbutun, Michael Depledge, and Hakan Jakobsson, on the equal day herewith, (attorney docket no. 3018-035) the contents of which are incorporated herein by reference.

U.S. patent application Ser. No. 08/808,094, entitled "INDEX SELECTION FOR AN INDEX ACCESS PATH" now pending filed by Hakan Jakobsson, Michael Depledge, Cetin Ozbutun, and Jeffrey I. Cohen, on the equal day herewith, (attorney docket no. 3018-037) the contents of which are incorporated herein by reference.

U.S. patent application Ser. No. 08/807,429, entitled "QUERY PROCESSING USING COMPRESSED BITMAPS" now pending, filed by Cetin Ozbutun, Jeffry I. Cohen, Michael Depledge, Julian Hyde, Hakan Jakobsson, Mark Kremer, and Quoc Tai Tran, on the equal day herewith, (attorney docket no. 3018-039) the contents of which are incorporated herein by reference.

U.S. patent application Ser. No. 08/807,451, entitled "BITMAPPED INDEXING WITH HIGH GRANULARITY LOCKING" now pending, filed by Michael Depledge, Jeffrey I. Cohen, Hakan Jakobsson, Mark Kremer, Cetin Ozbutun, Quoc Tai Tran, and Alexander C. Ho, on the equal day herewith, (attorney docket no. 3018-040) the contents of which are incorporated herein by reference.

U.S. patent application Ser. No. 08/808,585, entitled "UPDATING BITMAPPED INDEXES" now pending filed by Michael Depledge, Hakan Jakobsson, Cetin Ozbutun, Jeffrey I. Cohen, and Quoc Tai Tran, on the equal day herewith, (attorney docket no. 3018-041) the contents of which are incorporated herein by reference.

U.S. patent application Ser. No. 08/808,560, entitled "BITMAP INDEX COMPRESSION" now pending, filed by Jeffrey I. Cohen, Michael Depledge, Hakan Jakobsson, Mark Kremer, Cetin Ozbutin, and Quoc Tai Tran, on the equal day herewith, (attorney docket no. 3018-042) the contents of which are incorporated herein by reference.

U.S. patent application Ser. No. 08/808,586, entitled "COMBINING BITMAPS WITHIN A MEMORY LIMIT" now pending, filed by Cetin Ozbutun, Jeffry I. Cohen, Michael Depledge, Julian Hyde, Hakan Jakobsson, Mark Kremer, and Quoc Tai Tran, on the equal day herewith, (attorney docket no. 3018-078) the contents of which are incorporated herein by reference.

FIELD OF THE INVENTION

This invention relates to database systems and, more specifically, to using incompatible indexes during the execution of queries within a database system.

BACKGROUND OF THE INVENTION

Indexes are data structures used to process queries by providing relatively fast access to a set of data based on key values. Database systems historically have included one or two index types to enable database users to improve query processing performance. Each index type has its own advantages and disadvantages, and provides output in a particular format. The output format of each type of index largely dictates the type of operations for which the index type is best suited.

One type of index is a B-tree index. A B-tree index has branch nodes and leaf nodes. The branch nodes contain pointers to other nodes and data that indicates the range of values associated with the nodes to which they point. The leaf nodes store the index entries. Each index entry includes a [key, rowid] pair, where "key" is a particular key value and "rowid" is a row identifier that points to a particular row of a data table that contains that particular key value.

When a B-tree is used to process a query, the output of the B-tree index is a sequence of rowids. For example, use of a B-tree index built on a "first name" column to find records having a first name equal to "Fred" would return the rowids from all of the index entries in the B-tree that contain the key value "Fred". Hence, if a data table had ten rows of data and rows 1, 2, 5, and 9 had "Fred" in the first name column, then the B-tree index would return the result "1, 2, 5, 9." The B-tree type index is particularly advantageous for data having uniqueness constraints.

Another type of index is a bitmap index. Bitmap indexes are similar to B-tree indexes except that each index entry in a bitmap index contains a [key, bitmap] pair, where "key" is a particular key value, "bitmap" is a series of bits, each bit in the bitmap corresponds to a row in the table associated with the bitmap index, and the value of each bit indicates whether the corresponding row contains the key value specified in the index entry. The bitmap index is particularly advantageous for data having a low cardinality. For example, a bitmap index would only have two index entries if built on a "gender" column of a table that can only contain two possible key values "M" and "F".

Using the above example where the first name "Fred" is found in rows 1, 2, 5, and 9, a bitmap index built on the same "first name" column would return the result "1100100010," to a search for the name "Fred". The first bit corresponds to the first row of data and the last bit corresponds to the tenth row of data. Since the bitmap returned by bitmap indexes is a Boolean value, bitmap indexes are particularly advantageous for processing queries that specify Boolean operations.

Conventional query processing techniques use only a single index type for a given query. For example, assume that a B-tree index is built on the "last name" column of a table, while a bitmap index is built on the "gender" column of the same table. Using conventional query processing, a query that specified values for both the last name and the gender (e.g. "last name=Johnson and gender=F") would either use the B-tree or the bitmap index, but not both.

Specifically, the B-tree index may be accessed to identify the rows that satisfy "last name=Johnson" criteria. These rows would be retrieved from the table and inspected to determine whether the value in the gender column satisfies the second criteria "gender='F'". Alternatively, the bitmap index may be used to identify the rows that satisfy "gender=F". These rows would be retrieved from the table and inspected to determine whether the value in the "last name" column satisfies the criteria "last name=Johnson". In either case, only one type of index is used and, consequently, rows that do not satisfy the query have to be retrieved from the table and inspected.

Hence, there is a need for a mechanism that improves query processing by combining the use of different index types to minimize the rows of data that need to be retrieved from a table during query processing.

SUMMARY OF THE INVENTION

A method and apparatus for processing a query combines the use of different index types to minimize the rows of data that need to be retrieved from a table. According to one aspect of the present invention, a first index is accessed based on a query to produce a first result having a first format. A second index is also accessed based on the query to produce a second result having a second format. The first result is converted into a converted result having the second format, and the converted result and the second result are combined to obtain an end result. The end result can then be used to locate data that satisfies the query. Hence, indexes having different properties may be combined to process a query.

In another aspect of the present invention, a query is processed by selecting an execution path from among a set of execution paths having respective execution costs, where at least one of the execution paths includes the step of accessing a first index based on the query to produce a first result having a first format, accessing a second index based on the query to produce a second result having a second format, converting the first result into a converted result having the second format, combining the converted result and the second result into an end result, and using the end result to locate data that satisfies the query. A cost-based optimizer may thus select from execution paths based on respective execution costs, where one execution path effectively converts a first index having a first index type into a second index type by converting the results from the first index into a converted result having the second format. The converted result can then be combined using logical operators with the second result from an index having a second index type. Hence, the present invention enables the logic combination of incompatible types of indexes to process a single query.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for executing a query using incompatible types of indexes is described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

HARDWARE OVERVIEW

Figure 1:
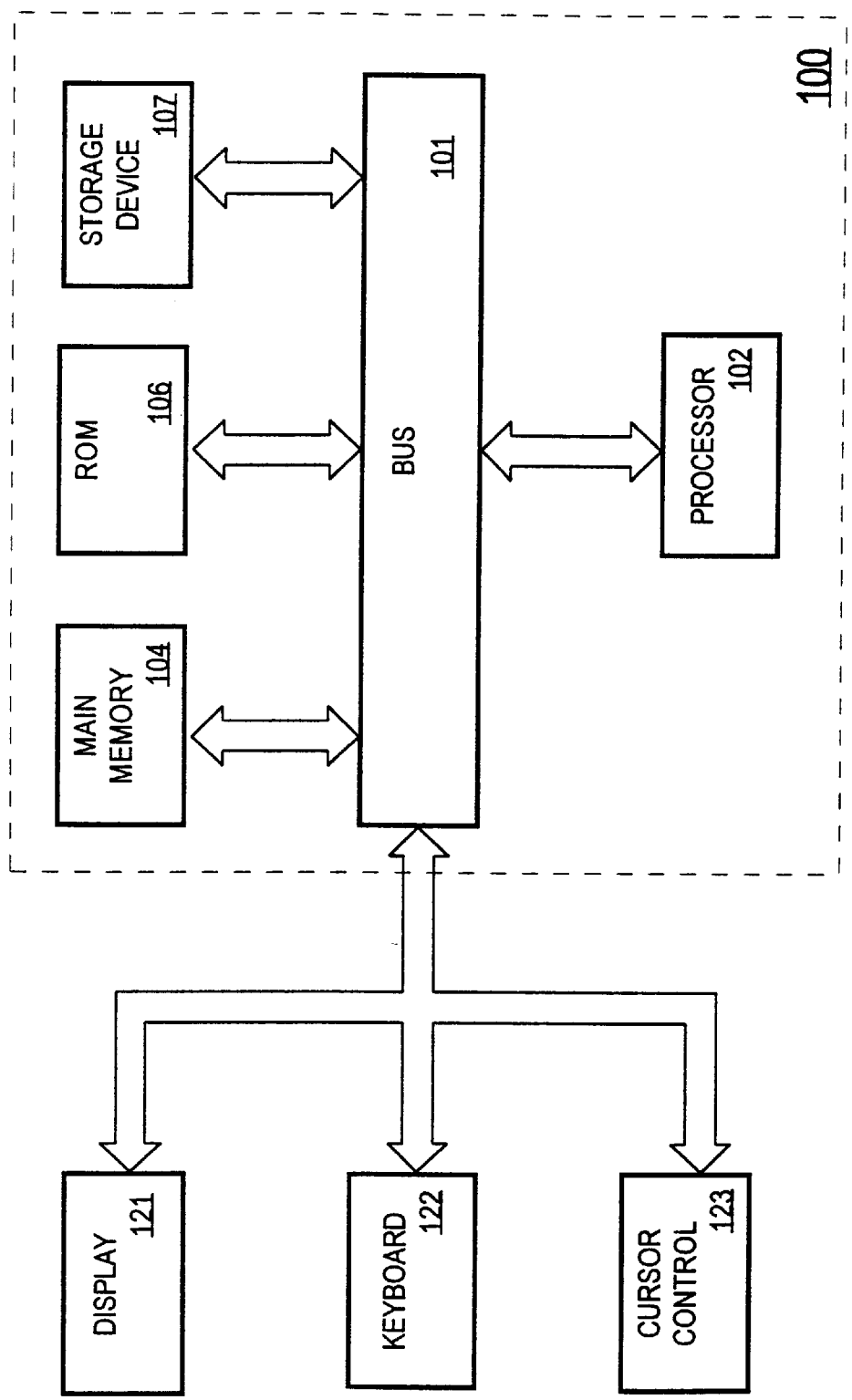
FIG. 1 is a block diagram of a computer system that may be used to implement an embodiment of the invention.

FIG. 1 is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

The present invention is related to the use of computer system 100 to process queries. According to one embodiment, queries are processed by computer system 100 in response to processor 102 executing sequences of instructions contained in memory 104. Such instructions may be read into memory 104 from another computer-readable medium, such as data storage device. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

COMBINING DIFFERENT INDEX TYPES

The present invention is directed to combining the use of incompatible types of indexes to process a single query. Each index type has its own set of distinctive properties, and provides output data in a particular format.

The output format of each type of index largely dictates the type of operations for which the index type is best suited. As described below, incompatible index types are combined by identifying the distinctive properties of each index type, and establishing a set of conversion or transformation operators to translate the output of one index type into the format of another index type. The converted result can then be combined with another index output having an output format that is compatible with the converted result. The combination of multiple index types enables a cost-based optimizer to select an execution path having the lowest overall cost for processing a query.

Figure 2A:
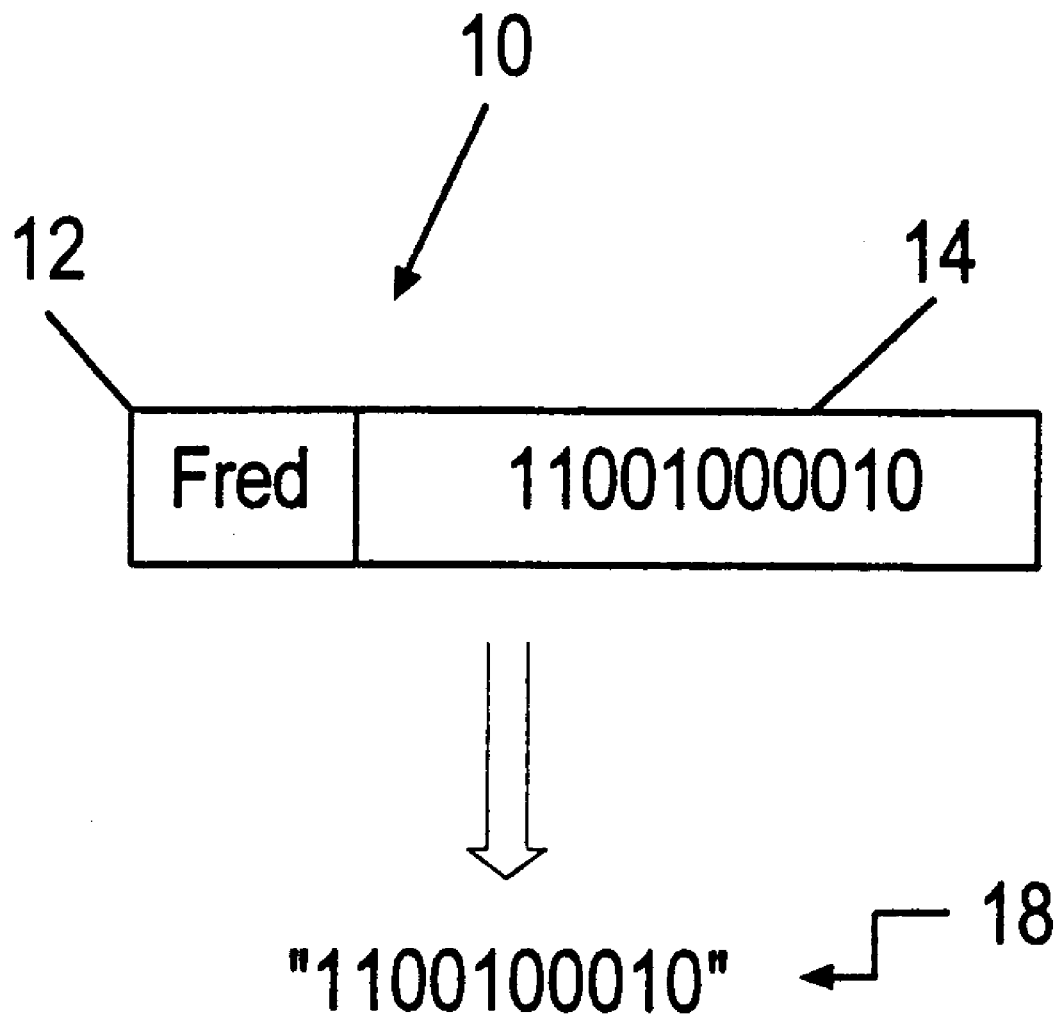
FIGS. 2A and 2B are diagrams illustrating bitmap and B-tree index output formats, respectively.
Figure 2B:
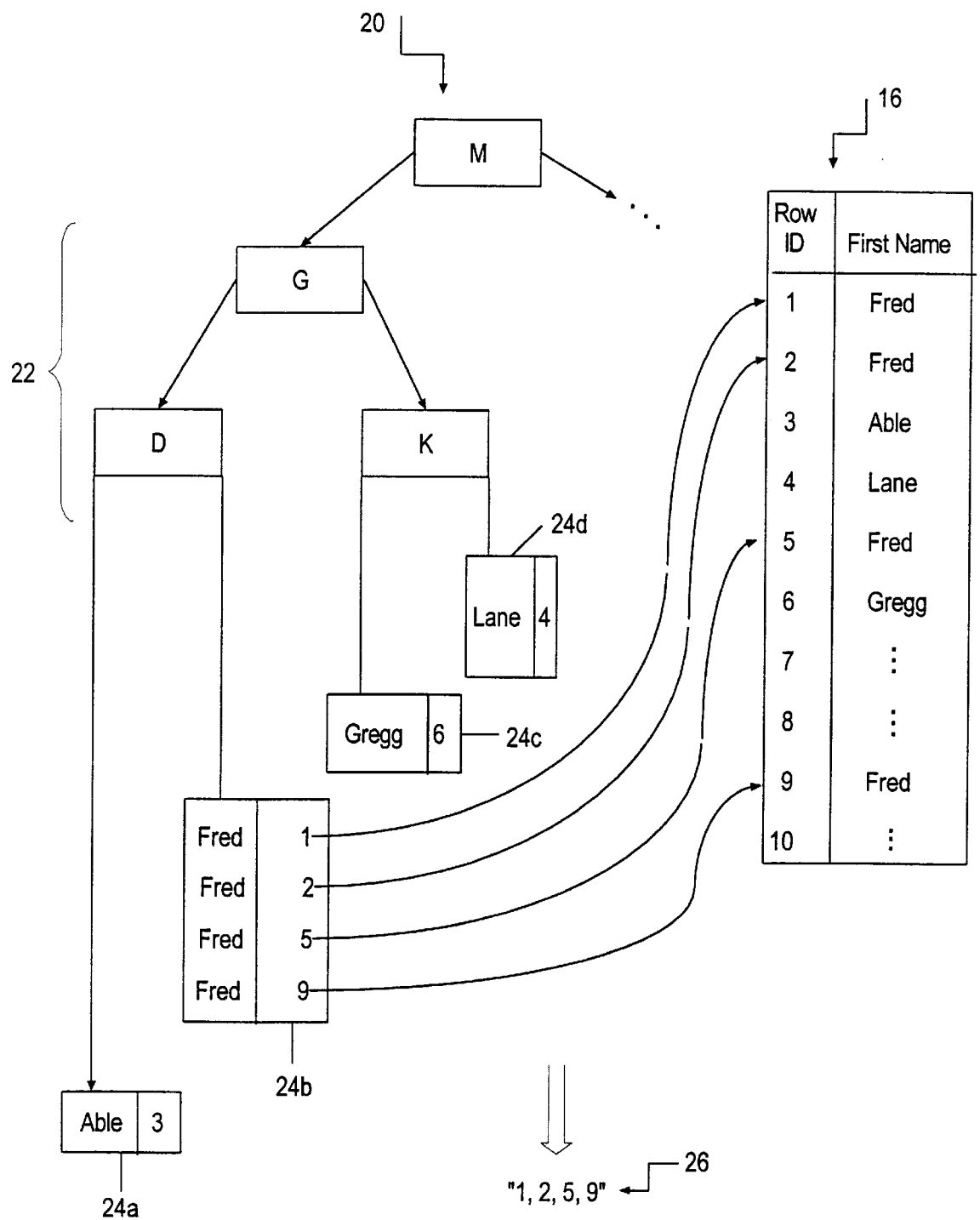

FIGS. 2A and 2B are diagrams illustrating output formats for a bitmap index and a B-tree index, respectively. An index entry 10 of a bitmap index has a key 12 and a bitmap 14. The index entry illustrated in FIG. 2A is from a bitmap index built on a first name column, and has a key value "Fred". The bitmap index entry 14 indicates which corresponding rows in a data table 16, shown in FIG. 2B, have the key value "Fred". Accessing the bitmap 10 during query processing results in a bitmap output that has a format as shown by reference numeral 18. Since the bitmap 18 is a Boolean value, the bitmap index 10 is particularly advantageous for processing queries that contain Boolean operations.

FIG. 2B illustrates an output format for a B-tree index 20 of the table 16. The B-tree index 20 includes branch nodes 22 and leaf nodes 24 A, B, C, and D. The leaf nodes 24 contain index entries in the form of a [key, rowid] pair. Within a leaf node, the index entries are sorted based on key value. The index entries with the same key value are sorted based on rowid. When B-tree 20 is used to find all rows with the name "Fred", the output of the B-tree is a sequence of rowids having the format indicated by reference numeral 26.

According to an embodiment of present invention, a set of conversion or transformation operators translate the output of one index type into the format of another index type. One example of converting index outputs is the conversion of a bitmap index output to a B-tree output format having a sequence of rowids. As shown in FIG. 2A, the bitmap index output 18 has a sequence of ones and zeros corresponding to the rows of the table 16. However, a table access cannot be driven by the bitmap 18 in its current bit-stream format. Hence, since a table access is driven by a rowid stream, the bitmap 18 is converted to a stream of rowids using a bitmap conversion operator.

Figure 6:
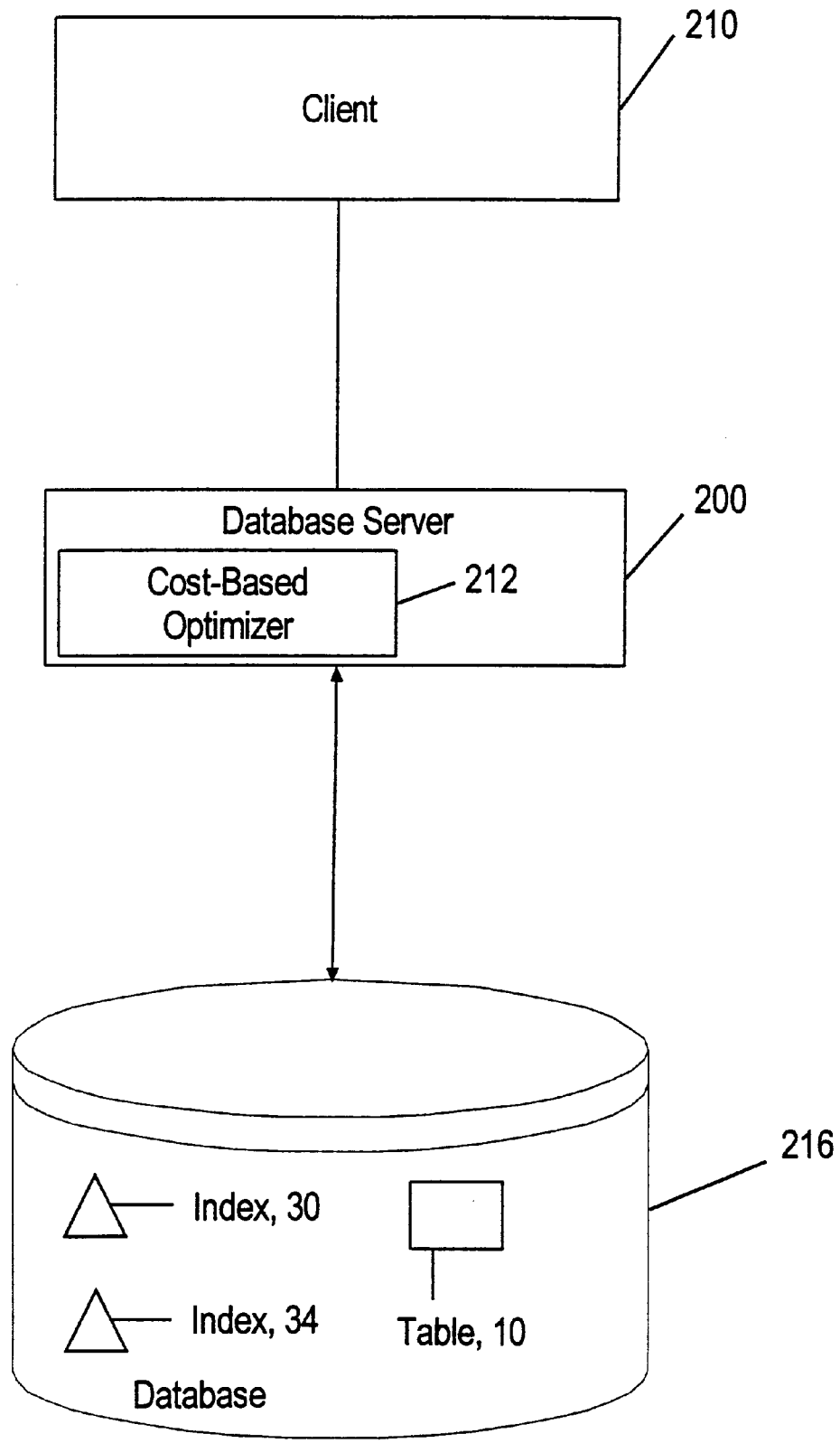
FIG. 6 is a diagram of a database server architecture according to an embodiment of the present invention.

FIG. 6 is a block diagram illustrating a database server architecture according to an embodiment of the present invention. The database server 200 receives a query from a client 210, and accesses data stored in a database 216 in order to satisfy the query. The database server 200 includes a bitmap conversion operator 214 that converts a sequence of rowids 26 of FIG. 2B into the bitmap pattern 18 in FIG. 2A, and vice versa. Hence, the bitmap conversion operator can convert a bitmap output format 18 to a B-tree output format 26, and can perform the inverse operation of converting the sequence of rowids according to the B-tree output format 26 to the bitmap output format 18.

Hence, the database server 200 includes a bitmap conversion operator 214 that converts the bitmap pattern 18 to a sequence of rowids, enabling the database server to use the converted rowid stream to access the data table 16 in the database 216. The combination of bitmap index access and bitmap conversion is functionally equivalent to the output of a B-tree index 26, which outputs a sequence of rowids.

Figure 3:
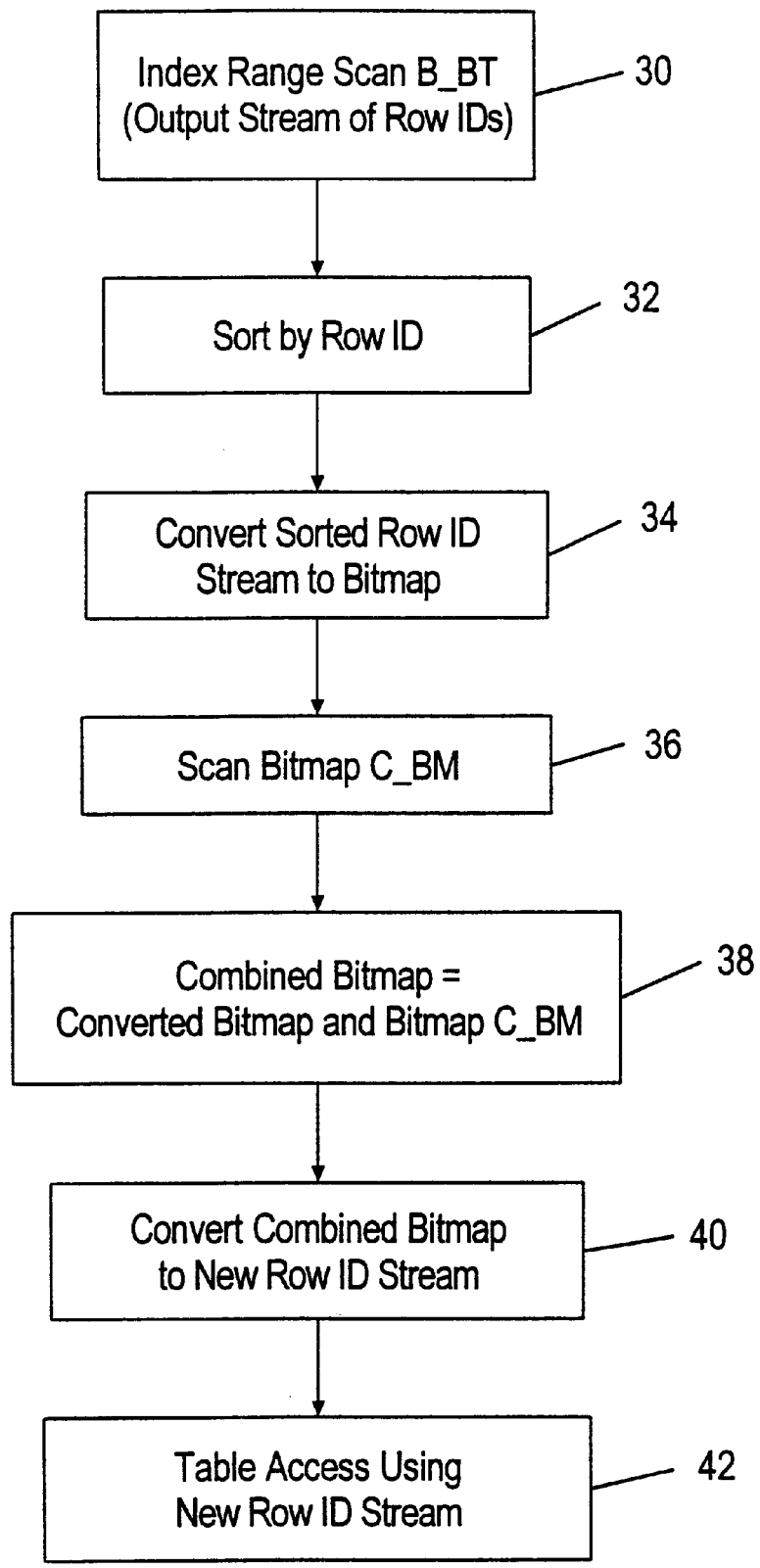
FIG. 3 is a flow diagram illustrating conversion and combining of bitmap and B-tree indexes according to an embodiment of the present invention.

FIG. 3 is a flow diagram illustrating the conversion of the output of a B-tree index to a bitmap, combining two bitmaps, and converting the combined bitmap to a B-tree output format. The flow diagram of FIG. 3 illustrates an execution plan by the database server 200 in executing the SQL query "select sum (A) from table X where B between 100 and 200 and C=3". An execution plan for this SQL statement is illustrated below in Table 1:

TABLE 1

| OPERATION | OPTIONS | OBJ NAME |
|---|---|---|
| SELECT STATEMENT | | |
| SORT | AGGREGATE | |
| TABLE ACCESS | BY INDEX ROWID | TABLE X |
| BITMAP CONVERSION | TO ROWIDS | |
| BITMAP AND | | |
| BITMAP INDEX | SINGLE VALUE | C_BM |
| BITMAP CONVERSION | FROM ROWIDS | |
| SORT | ORDER BY | |
| INDEX | RANGE SCAN | B_BT |

The execution plan in Table 1 above shows both a conversion of the output of a B-tree index to a bitmap, and a conversion of a bitmap to a sequence of rowids (i.e., the output of a B-tree index). The top level sort performs an aggregation, where the values of the column "A" in the table "table X" are summed from the rows that satisfy the predicate "B between 100 and 200 and C=3." The first step of the execution plan, shown at the bottom of Table 1, is to perform an index range scan of the B-tree index "B_BT" in step 30 of FIG. 3. The output of the index range scan in step 30 is a sequence of rowids. The output of the index range scan is sorted by rowid in step 32, and the sorted rowid sequence is supplied to the bitmap conversion operator 214 that converts the sorted rowid sequence to a bitmap ("converted bitmap") in step 34. The bitmap index "C_BM" is then scanned in step 36 to obtain the bitmap for the column "C" having a value equal to three (i.e., C=3). The converted bitmap and the scanned bitmap "C_BM" are then logically ANDed using a "bitmap AND" operator in order to obtain a combined bitmap in step 38.

The combined bitmap is then converted in step 40 by the bitmap conversion operator 214 from the bitmap format 18 to the sequence of rowids, i.e., the B-tree index format 26 as a new rowid stream. The new rowid stream output by the bitmap conversion operator 214 in step 40 is then used to table access the indexed rows of the table "table X" in step 42 in order to access the values of the column "A" of the table "table X" that satisfy the predicate "B between 100 and 200 and C=3." The accessed values of the "A" column can then be aggregated to produce a result for the "select sum(A)" operation.

As shown above, a bitmap format can be converted to a B-tree format in order to obtain a sequence of rowids. Similarly, the bitmap conversion operator 214 may be used to convert the B-tree format 26 having the sequence of rowids to the bitmap format 18. Once the output formats are compatible, the index outputs may be easily combined, for example by using Boolean logic on bitmap-formatted outputs.

SELECTING PATHS BASED ON COST

FIG. 6 shows the database server 200 including a cost-based optimizer 212. The cost-based optimizer 212 considers different execution paths based upon the available access methods and determines the respective costs of executing the execution paths by the server. The cost-based optimizer 212 then selects one of the identified paths having the lowest overall execution cost, enabling the database server 200 to execute the selected path having the lowest overall cost.

Figure 4:
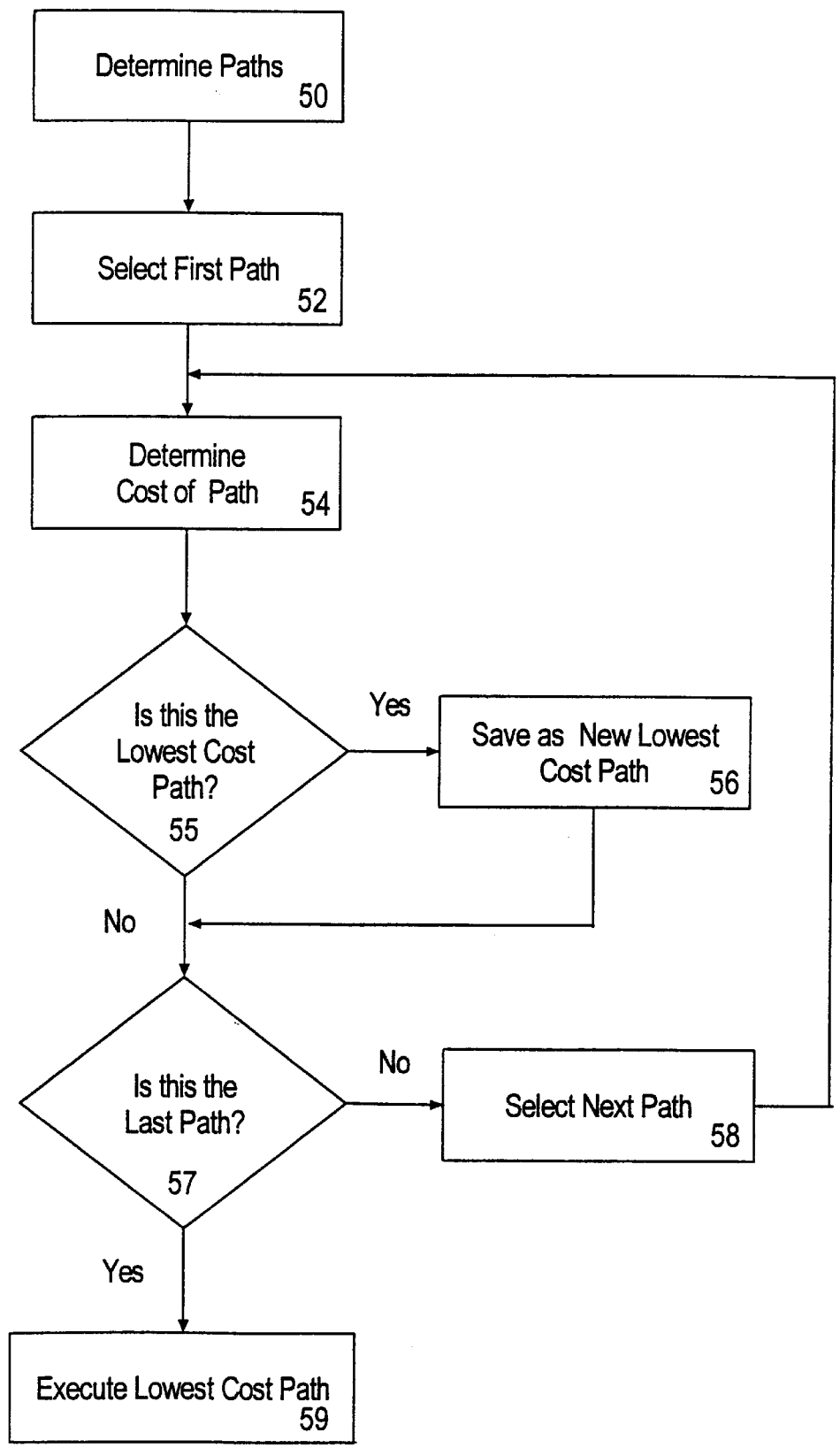
FIG. 4 is a flow diagram illustrating a method of processing a query according to an embodiment of the present invention.

FIG. 4 is a diagram illustrating the method of processing a query according to an embodiment of the present invention using the cost-based optimizer. The cost-based optimizer 212 determines in step 50 one or more execution paths for satisfying the query. At step 52 a first execution path of the one or more execution paths identified at step 50 is selected.

At step 54, the cost of the currently selected execution path is determined. At step 55, the cost of the currently selected execution path is compared with the cost of the previously evaluated path with the lowest cost. If the currently selected execution path costs less than the previously evaluated path with the lowest cost, then in step 56 data is saved to record that the currently selected execution path is the new lowest cost path.

Steps 57 and 58 define a loop that repeats steps 54, 55 and 56 for each of the execution paths identified at step 50. When the last execution path is processed, the saved data will indicate the lowest costing execution path of all the execution paths identified at step 50. Control then passes from step 57 to step 59, where the lowest cost execution path is executed.

Figure 5:
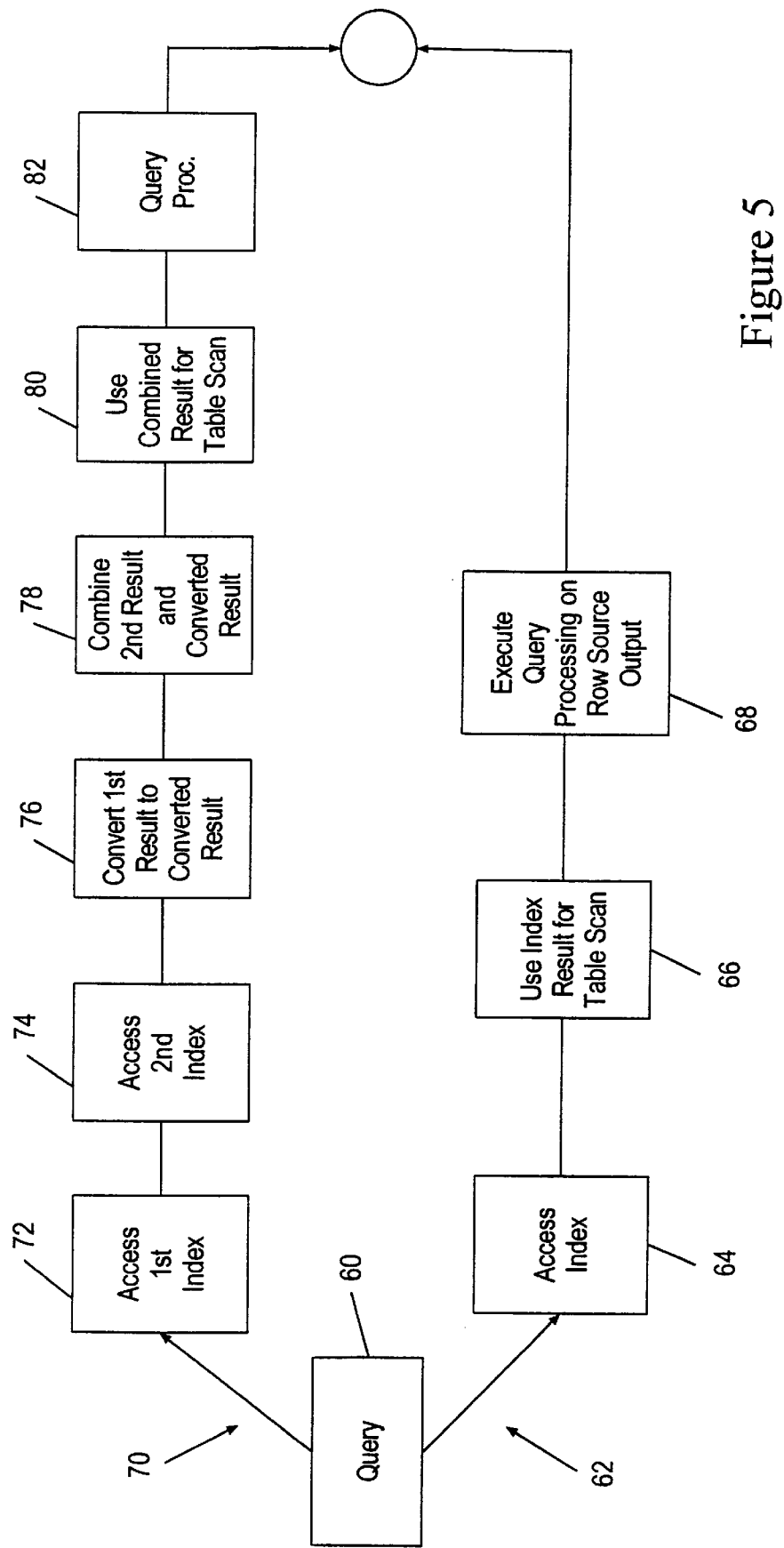
FIG. 5 is a diagram illustrating a plurality of execution paths for executing a specified query.

FIG. 5 is a diagram illustrating alternative execution paths for a query 60. As shown in FIG. 5, a first execution path 62 executes the query 60 by accessing a first index in step 64 based on the query to produce a first result having a first format. The execution path 62 then uses the first result in step 66 to locate data, for example by performing a table scan based on the first result from accessing the first index. The results of the table access in step 66 may then undergo additional processing in step 68 in order to satisfy the query. Hence, additional query processing in step 68 may require additional rows to be retrieved from a table and inspected to determine whether the data from a retrieved row fully satisfied the specified query.

Execution path 70 illustrates an execution path that combines incompatible types of indexes to process the query. As shown in FIG. 5, the execution path 70 accesses the first index in step 72 to produce a first result having a first format. The execution path 70 then accesses a second index in step 74 based on the query to produce a second result having a second format. The execution path converts the first result in step 76 into a converted result having the second format. The execution path 70 then combines the converted result and the second result in step 78 into an end result, e.g., a combined bitmap (see step 38 of FIG. 3). The execution path 70 then uses the end result in step 80 to perform a table access of the data that satisfies the query. If necessary, additional query processing may be performed in step 82, after which point the results of the query are returned.

As shown in FIG. 5, the execution path 62 executes the query 60 using conventional techniques, whereas the execution path 70 combines incompatible types of indexes to process a single query, minimizing the table scans necessary to obtain the data to satisfy the query.

As shown in FIG. 4, the cost-based optimizer determines the paths 62 and 70 in step 50. After determining the execution paths 62 and 70, the cost-based optimizer 212 determines the cost of the first execution path 62, including the corresponding costs of steps 64, 66, and 68. The relative costs of these steps are combined to determine an overall cost for execution path 62.

The cost-based optimizer 212 also determines the overall costs of the execution path 70 based on the respective costs of steps 72, 74, 76, 78, 80, and 82. The cost-based optimizer 212 then selects one of the execution paths 62 or 70 based on the corresponding overall cost of execution. After the cost-based optimizer selects one of the execution paths in step 56, the database server 200 executes the selected path in step 59 to process the query.

According to the present invention, a query is processed by combining different index types to minimize the rows of data that need to be retrieved from a table. An index conversion operator converts the output format of one type of index into another output format for combination with another index type. Hence, use of conversion operators enables incompatible index types to be combined based on compatible formats.

Although the disclosed embodiment has been described with respect to a bitmap conversion operator that converts between B-tree index format and bitmap index format, it will be appreciated that other conversion operators may be developed to provide additional flexibility between incompatible index types. For example, conversion operators may be implemented to convert spatial indexes (e.g., R-trees, HH indexes, quad-trees, etc.), context indexes, etc. In addition, conversion operators may be developed to convert index outputs into a generic output format for combination purposes, after which the combined index result is further converted for subsequent query processing.

In addition, various cost-based optimization techniques may be used to identify optimum index combinations to process a single query. Additional details related to selecting an execution path are disclosed in Selinger et al., "Access Path Selection in a Relational Database Management System," IBM Research Division, San Jose, Calif. 95193 (1979), the disclosure of which is incorporated in its entirety by reference.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method of processing a query that specifies data stored in a computer system, the method comprising the steps of:

accessing a first index based on the query to produce a first result having a first format;

accessing a second index based on the query to produce a second result having a second format;

converting the first result into a converted result having the second format;

combining the converted result and the second result into an end result; and using the end result to locate data that satisfies the query.

2. The method of claim 1, wherein:

the step of accessing a first index includes the step of accessing a B-tree index; and the step of accessing a second index includes the step of accessing a bitmap index.

3. The method of claim 2, wherein the first result is a sequence of row identifiers that identify rows in a table and the step of converting the first result into a converted result includes the step of converting the sequence of row identifiers into a series of bits corresponding to rows of the table.

4. The method of claim 3, wherein the step of combining the converted result and the second result comprises performing a logical AND operation between the converted result and the second result to obtain the end result.

5. The method of claim 3, wherein the step of combining the converted result and the second result comprises performing a logical OR operation between the converted result and the second result to obtain the end result.

6. The method of claim 1, wherein;

the step of accessing a first index includes the step of accessing a bitmap index; and the step of accessing a second index includes the step of accessing a B-tree index.

7. A method of processing a query that specifies data stored in a computer system, the method comprising the steps of:

A) determining a first cost of a first execution path that includes the steps of:
  A1) accessing a first index based on the query to produce a first result having a first format,
  A2) accessing a second index based on the query to produce a second result having a second format,
  A3) converting the first result into a converted result having the second format,
  A4) combining the converted result and the second result into an end result, and
  A5) using the end result to locate data that satisfies the query.

B) determining a second cost of a second execution path that includes the steps of:
  B1) accessing the first index based on the query to produce a first result having a first format,
  B2) using the first result to locate data that satisfies the query without accessing the second index, C) selecting a selected execution path from among a set of execution paths that include the first execution path and the second execution path, and D) executing the selected execution path.

8. The method of claim 7, wherein:

the step of accessing a first index includes the step of accessing a B-tree index; and the step of accessing a second index includes the step of accessing a bitmap index.

9. A database system comprising:

a database storing stored data, a first index of the stored data and a second index of the stored data; and a database server for processing a query by:

accessing the first index based on the query to produce a first result having a first format;

accessing the second index based on the query to produce a second result having a second format;

converting the first result into a converted result having the second format;

combining the converted result and the second result into an end result; and using the end result to locate data from said database that satisfies the query.

10. The system of claim 9, wherein:

the first index is a B-tree index; and the second index is a bitmap index.

* * * * *